Stephen Barne's IMP'T IN HANDLES F'R POCKET CUTLERY
Assignor to Self. W. S. Sanford & John Gardiner

74279

PATENTED
FEB 11 1868

Stephen Barnes
Inventor

Witnesses
John H. Shumway
A. J. Tibbits

By his Attorney

United States Patent Office.

STEPHEN BARNES, OF NEW HAVEN, CONNECTICUT, ASSIGNOR TO HIMSELF, W. S. SANFORD, AND JOHN GARDNER, OF SAME PLACE.

Letters Patent No. 74,279, dated February 11, 1868.

IMPROVEMENT IN HANDLES FOR POCKET-CUTLERY.

The Schedule referred to in these Letters Patent and making part of the same.

*To all whom it may concern:*

Be it known that I, STEPHEN BARNES, of New Haven, in the county of New Haven and State of Connecticut, have invented a new Improvement in Handles for Pocket-Cutlery; and I do hereby declare the following, when taken in connection with the accompanying drawings and the letters of reference marked thereon, to be a full, clear, and exact description of the same, and which said drawings constitute part of this sprecification, and represent in—

Figure 1:
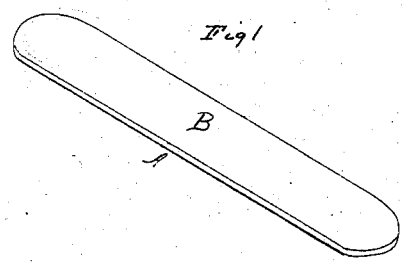
Figure 2:
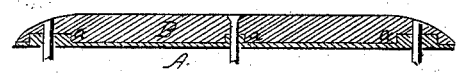
Figure 3:
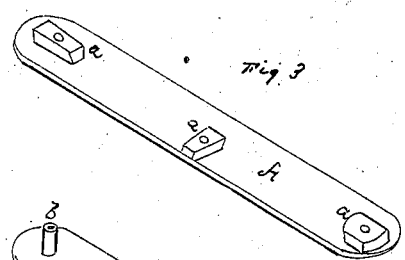
Figure 4:
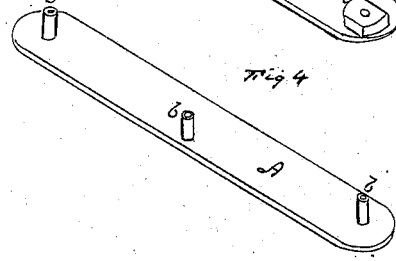

Figure 1, a perspective view of one side of a handle.
Figure 2, a longitudinal section of the same.
Figures 3 and 4, the manner of preparing the plates; and in
Figure 5, a transverse section.

This invention relates to an improvement in the manner of attaching the side of the handle to the plate, and consists in preparing the plate so as to receive a composition facing, and so that, when the composition is pressed upon the plate, it will firmly adhere thereto.

To enable others to understand my improvement I will proceed to describe the same as illustrated in the accompanying drawings.

A is the plate for one side of the knife-handle, and is provided with blocks or projections, *a*, at the points where the rivets pass through, which secure the two sides together; and the blades between these blocks are better made of a dovetail form, so as to be smaller at the base than upon the upper side.

Then the plate is placed in a mold, and the composition B, in a a plastic state, is pressed hard, and into the form upon the plate, forcing itself around the blocks *a*, and so that, when the composition is dried or cured, the composition facing will adhere thereto in the most perfect manner, and without other security.

Having thus faced the plate A, I drill through the blocks A, so as to pass the rivets therethrough, as denoted in fig. 2.

Instead of the blocks *a*, small tubes, *b*, as denoted in fig. 4, may be set in proper position upon the plate A, so as to extend through the composition facing, and the plate faced in the same manner.

The rivets pass through the tubes and are otherwise treated in the usual manner in the manufacture of pocket-cutlery.

Figure 5:

To strengthen the plate, if it be required, I extend along and within the composition a wire, *d*, as denoted in fig. 5, which, in large handles, gives considerable additional strength; or, if preferred, the plates may be perforated with holes sufficiently large, and countersunk from the inside, so that the composition will press through the said holes, and thus secure the facing to the plate; and these may be in addition to the projections or tubes before described.

I do not broadly claim compressing the facing onto the handles of knives by using for the purpose a plastic material.

Having thus fully described my invention,
What I claim as new and useful, and desire to secure by Letters Patent, is—

1. The arrangement of the tubes *b* or blocks *a*, upon the plate A, so as to receive the rivets which secure the blades and the two sides of the handle together, substantially as and for the purpose herein set forth.

2. The introduction of a strengthening-wire, *d*, within the composition of the handle, in the manner described.

STEPHEN BARNES.

Witnesses:
JOHN H. SHUMWAY,
A. J. TIBBITS.